United States Patent [19]
Drawbaugh

[11] 3,768,253
[45] Oct. 30, 1973

[54] VORTEX RING NUCLEAR REACTOR

[75] Inventor: Donald W. Drawbaugh, Bethel Park, Pa.

[73] Assignee: Westinghouse Electric Corporation, Pittsburgh, Pa.

[22] Filed: May 13, 1968

[21] Appl. No.: 728,473

[52] U.S. Cl. .................................... 60/203, 176/39
[51] Int. Cl. ............................................ G21d , H05b
[58] Field of Search .......................... 60/203; 176/39

[56] References Cited
UNITED STATES PATENTS
3,202,582  8/1965  Rom ...................................... 176/39
3,270,496  9/1966  Rom ...................................... 60/203

Primary Examiner—Samuel Feinberg
Attorney—A. T. Stratton and Z. L. Dermer

[57]  ABSTRACT

A fluidized core nuclear reactor particularly adapted for use as a rocket engine. A gas or colloidal suspension of fissionable material is supplied to a chamber into which a light propellant gas is injected at selected flow rates and angles so as to form a rotating ring vortex of the fissionable material. In addition, a region of solid fissionable material may be employed with the gaseous fissionable material. When so employed, the solid fissionable material surrounds the fluid filled chamber and is separated therefrom by a "neutron gate," a moderator and thermal neutron absorber, the latter allowing thermal neutrons to pass only into the fluid filled cavity. The thermal peaking thereby produced in the fluidized region causes the light propellant gas to fluidized fuel ratio to be increased so that the light propellant gas can "suspend" the heavier fissionable material away from the wall and outlet of the cavity. The light propellant gas is heated by the fissioning material and exits from the cavity through a thrust producing nozzle. Flow directing means cause some divergence of the flow path of the propellant material adjacent to the mouth of the nozzle further enhancing suspension of the fissioning material.

7 Claims, 5 Drawing Figures

WITNESSES
Helen M. Farkas
Michael B. L. Hipps

INVENTOR
Donald W. Drawbaugh
BY Zigmund L. Werner
ATTORNEY

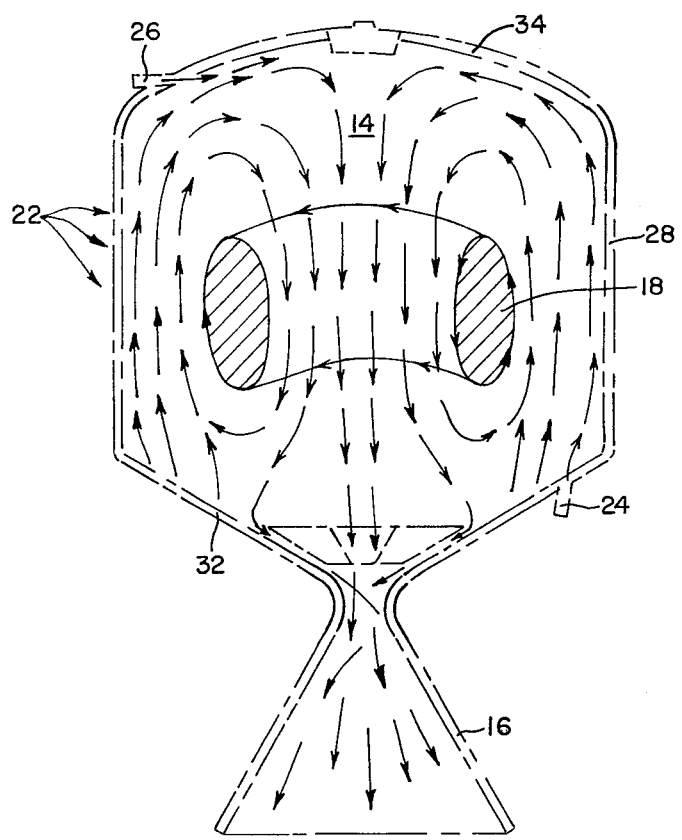
FIG. 2
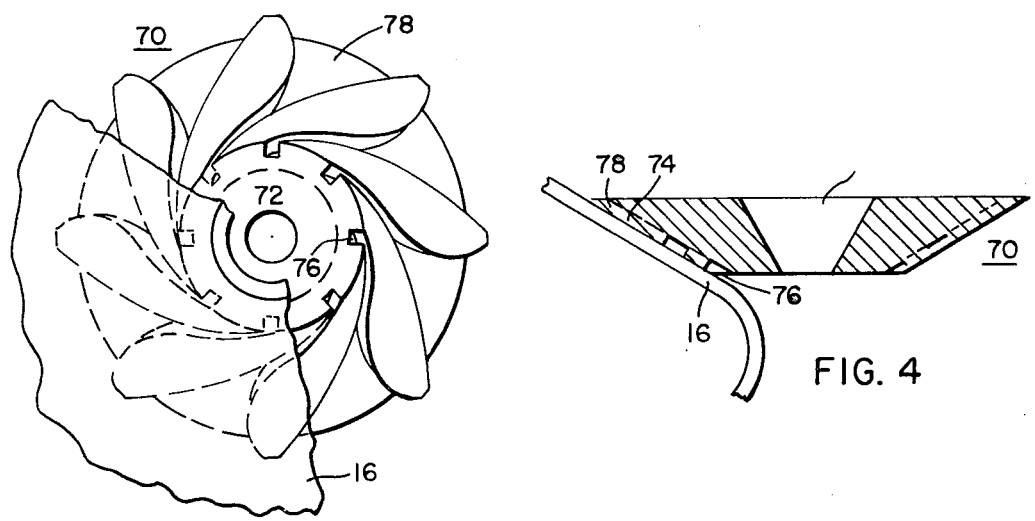
FIG. 4
FIG. 5

VORTEX RING NUCLEAR REACTOR

BACKGROUND OF THE INVENTION

This invention relates to nuclear reactors, and more particularly to nuclear rocket engines of the fluid vortex type.

Solid fuel element nuclear reactors are limited in their performance by the temperature which the structural material of the fuel elements can sustain without losing its strength; about 5000°F. For temperatures much higher than 5000°F, the nuclear fuel must be in the form of a fluid, i.e., collodial or gas. The colloidal suspension or gas must, of course, be contained within a suitable vessel or chamber. A primary difficulty has been to suspend the fissioning material within the cavity so that the inner wall of the chamber is not overheated and the fissionable material does not escape through the nozzled opening. Various methods have been proposed to accomplish what may be termed "self-containment suspension." One method has been to contain the fuel gas or colloid by vortex motion in a cylindrical container. An embodiment of this method may be seen in U.S. Pat. No. 3,270,496 to F. E. Rom and issued Sept. 6, 1966. There the vortex motion is obtained by injecting the gaseous material through tangential jets on the inner wall of the cavity so as to form a cylinder of the rotating gaseous mass.

The above concept of a jet-driven vortex has recently received substantial attention. It is now understood that a cylindrical vortex has three dimensional characteristics, i.e., that flow against the end walls of the chamber induces secondary axial motion. These end-wall effects tend to cause overheating of the cavity wall, reduce the containment properties of the vortex, and increase losses of fissionable material through the rocket nozzle. Moreover, it has not been demonstrated that secondary flow conditions can be constrained, and in particular that the well known "teacup" effect whereby flow is produced toward the axis of a rotating cylindrical vortex at the inlet to the nozzle can be overcome.

SUMMARY OF THE INVENTION

The aforementioned problems of prior art gas or colloidal nuclear rocket engines are circumvented by utilizing the propellant fluid flow to form the fissionable material in the chamber into a vortex ring. The vortex ring, as contemplated by this invention, is toroidal in outward configuration with the fluid particle motion being both around a center line perpendicular to the plane of the torus so as to form a closed curve and around the closed curve so as to form a ring. As will be recognized, this configuration is inherently self-contained.

The ring vortex of fissionable material is generated within a chamber in the rocket body. By way of example, the chamber may be of a generally frusto-spherical shape with propellant gas inlets situated in the interior wall of the cavity and substantially tangentially oriented thereto. The tangential gas inlets are situated both in the plane of the torus so as to produce unidirectional circulation flow about a center line perpendicular to the plane of the torus and at angles to this plane so as to produce circulation flow about the closed curve formed by the unidirectional circulation flow.

In accordance with the invention, the stability of the ring vortex can be increased by increasing the ratio of propellant fluid to fuel in the cavity. A good propellant fluid must be of low molecular weight so that it may be ejected through the nozzle at the highest possible velocity, e.g., hydrogen. On the other hand, the fissionable material is of high molecular weight, e.g., fissionable isotopes of uranium or plutonium. This means that a relatively large number of particles of the light propellant fluid will be necessary to control the flow path of the heavier fuel particles. This ratio can be increased in accordance with one embodiment of this invention, by surrounding the fluid core with a solid core which feeds thermalized neutrons into the fluid core to produce thermal peaking therein. A "neutron gate" is interposed between regions of fissionable material so that thermal peaking is not also produced in the solid region. The "neutron gate" is formed by placing a layer of moderating material, e.g., beryllium, in juxtaposed relationship with a thermal neutron absorber, e.g., cadmium. Fast neutrons produced in the solid region would pass through the thermal neutron absorber and would be moderated by the moderating material-producing thermal peaking the fluid region. However, neutrons going in the other direction, i.e., toward the solid region, would be thermalized by the moderator and captured by the thermal neutron absorber.

The stability of the ring vortex is also increased by allowing some propellant gas to follow divergent flow paths before entering the nozzle. This is accomplished by interposing a divergent flow producing means between the chamber outlet and the conventional convergent-divergent rocket nozzle. The propellant fluid thereby tends to produce a substantially closed envelope surrounding the toroidal vortex ring.

DESCRIPTION OF THE DRAWINGS

For a better understanding of the invention reference may be had to the accompanying drawings, in which:

FIG. 2 is a pictorial representation of the ring vortex and a vertical section of the general suspension flow pattern surrounding the vortex;

FIG. 4 is an expanded side view of the divergent flow producing means at the inlet to the nozzle of FIG. 1; and FIG. 5 is a bottom view of the means of FIG. 4.

PREFERRED EMBODIMENTS OF THE INVENTION

Figures 1, 3:
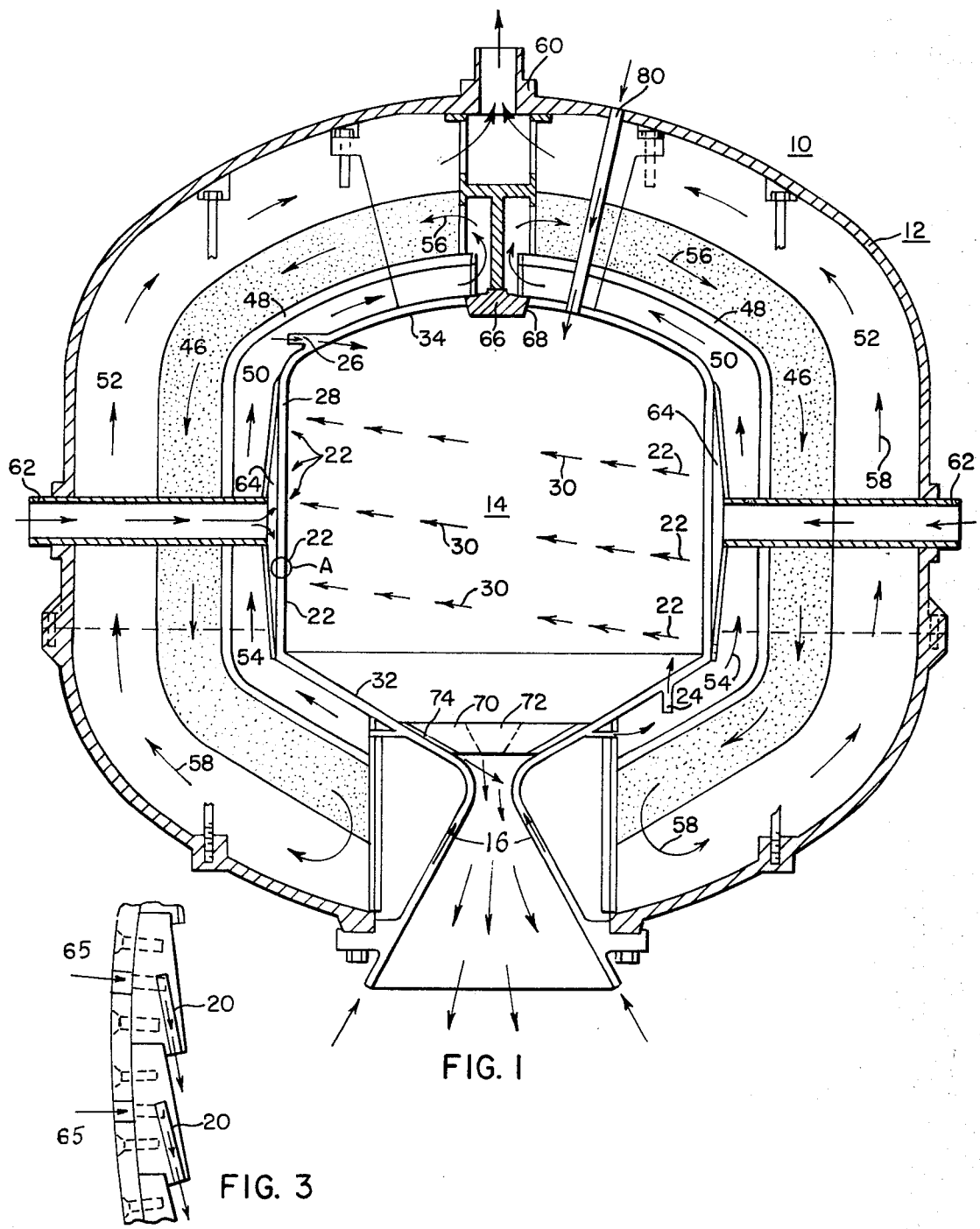
FIG. 1 shows a schematic vertical cross-sectional view of a nuclear rocket engine in accordance with this invention.
FIG. 3 is an expanded horizontal view of area A of the wall of the fission chamber of FIG. 1.

Referring now to FIGS. 1 and 2, there is shown a nuclear rocket engine 10 designed in accordance with and embodying this invention. The rocket engine 10 includes a housing 12 which encloses a fission chamber 14, and a convergent-divergent rocket nozzle 16 rigidly affixed to the housing 12.

A fluidized rotating ring vortex 18 of fissionable material, e.g., $U^{233}$ or $U^{235}$ is formed in the fission chamber 14. The fluidized ring vortex 18 may comprise a gas or colloidal suspension and is essentially toroidal in outward configuration, as shown in FIG. 2. The toroidal ring vortex 18 is characterized by particle motion around the axis of rocket to form a first closed curve, e.g., a circle, and around the first closed curve to form a ring shaped second closed curve. The fissionable core is shaped and suspended by a force field primarily produced by the injection of a light propellant gas, e.g., hydrogen.

In order to shape and suspend the vortex ring 18 so as to prohibit the hot fissioning fluid from impinging on the walls of the chamber 14 or escaping through the nozzle 16, the propellant gas is injected into the chamber 14 through substantially tangentially oriented injection ports 20, as shown in FIG. 3. More particularly, and for purpose of descriptive clarity, the injection ports 20 are divided into three sets designated as 22, 24, and 26 in FIGS. 1 and 2.

The injection ports 22 are situated in the cylindrical wall 28 of the fission chamber 14, and are substantially tangentially oriented thereto. The ports 22 also have a slight upward tilt so as to inject the light propellant gas away from the nozzle 16. This last described flow pattern is indicated by the arrows 30 in FIG. 1, which represent the direction of flow of propellant "particles." The particle motion is thus generally helical and away from nozzle 16.

The injection ports 24 (one of which is shown in FIGS. 1 and 2) are situated in the lower wall 32 of the chamber 14, and are oriented at a slight angle away from the axis of the engine 10. The direction of injection is thus toward the cylindrical wall 28 of the chamber 14. The function of the ports 24 is to act in cooperation with the upward tilting ports 22 to produce a circulation flow which will form a rotating ring of the otherwise cylindrical vortex produced by the ports 22.

A third set of injection ports 26 (one of which is shown in FIGS. 1 and 2) may be utilized situated in and directed substantially toward the midpoint of the upper wall 34, to enhance the rotating ring effect produced as explained above.

The three sets of injection ports 22, 24, and 26 thus produce a circulating envelope which forms and suspends the vortex ring 18. The vortex ring therefore takes the form of a toroid with closed circulation paths. In other words, a discrete element of the continuation of fissioning material may be viewed as following a helical path up the outside of the torous; then down the inside of the torus; then up the outside helix, and so on — forming a closed path. The "mechanism" thus described is inherently self contained.

As indicated, the propellant gas is admitted to the chamber 14 to form a force field sufficient to form and suspend the fissioning fluid vortex 18. This is facilitated where the ratio of the light propellant gas to the relatively heavy fissionable material is increased. In order to substantially increase this critical ratio, in accordance with this invention, a region 46 of solid fissionable fuel may be provided to substantially surround the chamber 14.

The region 46 essentially comprises pellets of fissionable material, e.g., $U^{233}$ or $U^{235}$, supported within a suitable lattice, for example graphite. The form of the region 46 may comprise structural matrix elements containing particles of the fissile material as is known in the art. The function of this region is to produce neutron flux peaking in the fluidized mass of fissionable material in the chamber 14. It is desirable to minimize the amount of solid fuel in region 46 in order to maximize performance. Therefore neutron flux peaking must be accomplished in the fluid core without producing flux peaking in the solid region 46. For this purpose a "neutron gate" is provided which consists of thermal neutron absorber 48 and moderator regions 50 and 52. The thermal neutron absorber 48 may be of cadmium which has a relatively high thermal neutron capture cross-section. The moderators 50 and 52 are preferably constructed of beryllium.

Fast neutrons which originate in the region 46 pass through the thermal neutron absorber 48 and are thermalized by the moderator 50. However, thermal neutrons originating in the chamber 14 cannot pass into the region 46 because they are thermalized in the moderator 50 and captured by the thermal neutron absorber 48. Thus a relatively small amount of solid fuel in region 46 can act as a driver and reduce the amount of fissionable fluid required in the chamber 14. Suspension of the ring vortex 18 is thereby enhanced.

The light propellant gas is supplied from a storage tank (not shown) where it is preferably retained in its liquid form. The gas is circulated by suitable means such as a turbine driven pump (not shown) to the nozzle 16 where it first enters the reactor system and is used to cool the nozzle 16 as is well known in the art.

The propellant gas, after passing through the cooling flow channel provided therefor in the nozzle 16 as indicated by arrows 19, is conveyed through the moderator 50 and the walls 28, 32, and 34 of the chamber 14, as indicated by the "first pass" arrows 54. Such cooling flow is necessary to keep these structural members from melting due to the great amount of heat generated in the chamber 14. All the structural members of the reactor are constructed with flow passages (not shown) for the passage of a coolant which is also perferably capable of acting as an efficient propellant.

The propellant then makes a second pass through passages provided therefor in the thermal neutron absorber 48 and the solid fueled region 46, as indicated by arrows 56.

A third pass is then made through the moderator or reflector 52. The fluid, after proceeding through moderator 52, as indicated by arrows 58, is conveyed to a turbine through outlet conduit 60 where the energy it has acquired in cooling the reactor is used to drive the pump (not shown) which circulates the propellant gas.

After leaving the turbine the propellant gas is pumped through turbine exhaust conduit 62 to an inlet plenum 64 of fission chamber 14.

The propellant gas is injected from the plenum 64 into the chamber 14 through conduits 65 and injection ports 20, see FIG. 3. Injection ports 24 and 26 may be supplied from lines from the plenum 64, by conduit means not shown, or through separate turbine exhaust lines. As has been previously described, the injection ports 20 are so oriented as to produce concentric helical flow paths within the chamber 14.

In order to increase the containment properties of the rotating ring vortex 18, flow directing members may be rigidly affixed at the top of the chamber 14 and at the entry to the nozzle 16. In furtherance of this purpose, a flow directing member 66 may be centrally affixed in the upper wall 34. Member 66 has inwardly curved and tapering side 68 which aids in directing the flow proceeding across the top of chamber 14 away from the center of the toroidal vortex 18. Any fissionable fluid entrained in the propellant gas is driven into the vortex due to centrifugal force produced by the circulation pattern in the chamber 14. Another flow directing member 70 may also be rigidly affixed in the inlet to the nozzle 16. The member 70 has a relatively large centrally located bore 72 and angled suction channels 74, see FIGS. 4 and 5. A substantial portion of the propellant exists from the chamber 14 through bore 72 and produces thrust due to its high velocity. The suction channels 74 slope inwardly toward the bore 72 and their relatively narrow exit ends 76 are situated adjacent the high velocity stream from the bore 72. Therefore, a powerful suction is produced within and adjacent the relatively wide entrance ends 78 of the channels 74. The suction draws a portion of the propellant outwardly from the central axis of the engine 10. The combination of the flow directing member 66 and the flow directing member 70 greatly facilitate the closed circulation pattern which the injection ports 20 initiate. Flow directing members 66 and 70 may be cooled by diverting a portion of the propellant fluid therethrough.

It should now be apparent that the fissionable ring vortex 18 particularly when used with the solid fueled region 46, the neutron gate consisting of the thermal neutron absorber 48 and moderators 50 and 52, produces an efficient and extremely high temperature source for the rocket engine 10 whereby the propellant gas can be heated to high velocities due to conduction, convection, and radiation. The reaction rate of the above system may be controlled by rotating neutron poison containing drums (not shown) situated in the moderator or reflector 52. The structure and operation of such drums are well known in the art and are described in the patent to F. E. Rom previously mentioned. Briefly, the drums have a portion of their surface constructed of a thermal neutron absorber. This surface may be turned toward the solid region 46 to reduce the neutrons available to sustain fission therein, or away to increase the rate of reaction. The reaction rate in the solid region 46 in turn controls the flux peaking in the ring vortex 18; as previously explained. The drums therefore control the reaction rate of the coupled solid and fluid reactor system 10.

The engine 10 is started by pumping the propellant gas throughout the system. The flow thereby produced both cools the structure of the system and produces the envelope for the fissionable fluid ring 18. The fissionable fluid is then injected preferably from a plurality of separated tanks through one or more conduits 80 (one is shown in FIG. 1) provided for this purpose. A sufficient amount of fissionable material is injected into the chamber to produce a critical state when coupled with the solid region. The rate of reaction is regulated by rotating the drums as mentioned.

While there has been shown and described what is at present considered to be the preferred embodiment of the invention, modifications thereto will readily occur to those skilled in the art. In particular, solid fuel region 46 may be enlarged so as to go critical independently from the vortex 18 which would be of advantage for pre-flight testing. Moreover, more or fewer sets of injection nozzles may be used depending on the flow guiding means utilized in chamber 14. It is not desired, therefore, that the invention be limited to the specific arrangement shown and described and it is intended to cover in the appended claims all such modifications as fall within the scope of the invention.

Therefore, I claim:

1. A nuclear rocket engine which comprises a chamber including a substantially cylindrical wall, a bottom wall and a top wall;
    said bottom wall having a nozzled opening therein;
    first means supplying a fissionable fluid into said chamber;
    second means for injecting a propellant fluid into said chamber, said second means comprising at least a first set of tangentially formed injecting conduits relative to and situated in the cylindrical wall of said chamber, said conduits further being oriented at a shallow angle toward the top wall of said chamber whereby a rotating ring vortex of the fissionable fluid is formed characterized by motion about a first closed curve so as to form a second closed curve.

2. The nuclear rocket engine of claim 1 wherein said second means further includes a second set of injecting conduits situated in the bottom wall and directed upwardly and angled toward the cylindrical wall whereby the formation of a closed ring of the vortex flow of fissionable fluid is enhanced.

3. The nuclear rocket engine of claim 2 wherein said second means further includes a third set of injecting conduits situated in the cylindrical wall adjacent the top wall and directed generally towards the center of said top wall whereby the formation of a closed ring of the vortex flow of fissionable material is further enhanced.

4. The nuclear rocket engine of claim 3 which additionally comprises:
    a region of fissionable material adjacent said chamber;
    a thermal neutron absorber and a neutron moderator interposed between said region of fissionable material and said chamber.

5. The nuclear rocket engine of claim 4 which additionally comprises:
    a first fluid guiding means for causing a divergence of flow in a portion of the propellant fluid adjacent said nozzled opening situated near the inlet end of the nozzled opening.

6. The nuclear rocket engine of claim 5 wherein:
    the first fluid guiding means has a relatively large centrally located bore therein through which a substantial portion of propellant fluid exits from the chamber; and
    said first fluid guiding means further has a plurality of channels with entrance ends adjacent the periphery of said guiding means and exit ends so situated with respect to the exiting propellant fluid as to produce suction within said channels.

7. The nuclear rocket engine of claim 6 and having:
    a second fluid guiding means situated centrally of the chamber top wall opposite the nozzled opening and having a curved and inwardly tapering side for directing fluid motion away from the axis of the chamber.

* * * * *